United States Patent
Maruyama

(10) Patent No.: US 10,829,118 B2
(45) Date of Patent: Nov. 10, 2020

(54) BRAKING SYSTEM OF INDUSTRIAL VEHICLE

(71) Applicant: KABUSHIKI KAISHA TOYOTA JIDOSHOKKI, Kariya-shi, Aichi-ken (JP)

(72) Inventor: Daisuke Maruyama, Aichi-ken (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 0 days.

(21) Appl. No.: 16/428,171

(22) Filed: May 31, 2019

(65) Prior Publication Data
US 2019/0367033 A1    Dec. 5, 2019

(30) Foreign Application Priority Data

Jun. 5, 2018 (JP) ................................ 2018-107777

(51) Int. Cl.
*B60W 30/18* (2012.01)
*B60T 13/66* (2006.01)
*B60T 15/02* (2006.01)
*B60T 13/14* (2006.01)
*B60W 10/188* (2012.01)
*B60W 10/06* (2006.01)

(52) U.S. Cl.
CPC ....... *B60W 30/18109* (2013.01); *B60T 13/14* (2013.01); *B60T 13/662* (2013.01); *B60T 15/028* (2013.01); *B60W 10/06* (2013.01); *B60W 10/188* (2013.01); *B60W 2510/0642* (2013.01); *B60W 2710/0644* (2013.01); *B60W 2710/18* (2013.01)

(58) Field of Classification Search
None
See application file for complete search history.

(56) References Cited

U.S. PATENT DOCUMENTS

| | | | |
|---|---|---|---|
| 6,553,759 B2* | 4/2003 | Matsufuji | B60K 17/04 60/435 |
| 9,902,385 B2* | 2/2018 | Okano | B60T 13/662 |
| 2019/0376571 A1* | 12/2019 | Yamamoto | B60T 13/148 |

FOREIGN PATENT DOCUMENTS

JP    63-033692 Y2    9/1988

* cited by examiner

*Primary Examiner* — Dirk Wright
(74) *Attorney, Agent, or Firm* — Sughrue Mion, PLLC

(57) ABSTRACT

A brake system includes an accumulator accumulating hydraulic oil discharged from a hydraulic pump, a hydraulic oil cooler cooling the hydraulic oil discharged from the hydraulic pump, a switch valve switching between a first oil channel that allows supplying the hydraulic oil from the hydraulic pump to the accumulator but not to the hydraulic oil cooler, and a second oil channel that allows supplying the hydraulic oil from the hydraulic pump to the hydraulic oil cooler, and a controller controlling an engine to increase an engine speed of the engine when a first detector detects timing to switch the switch valve from the second oil channel to the first oil channel and a second detector detects that the engine is running at idle.

4 Claims, 7 Drawing Sheets

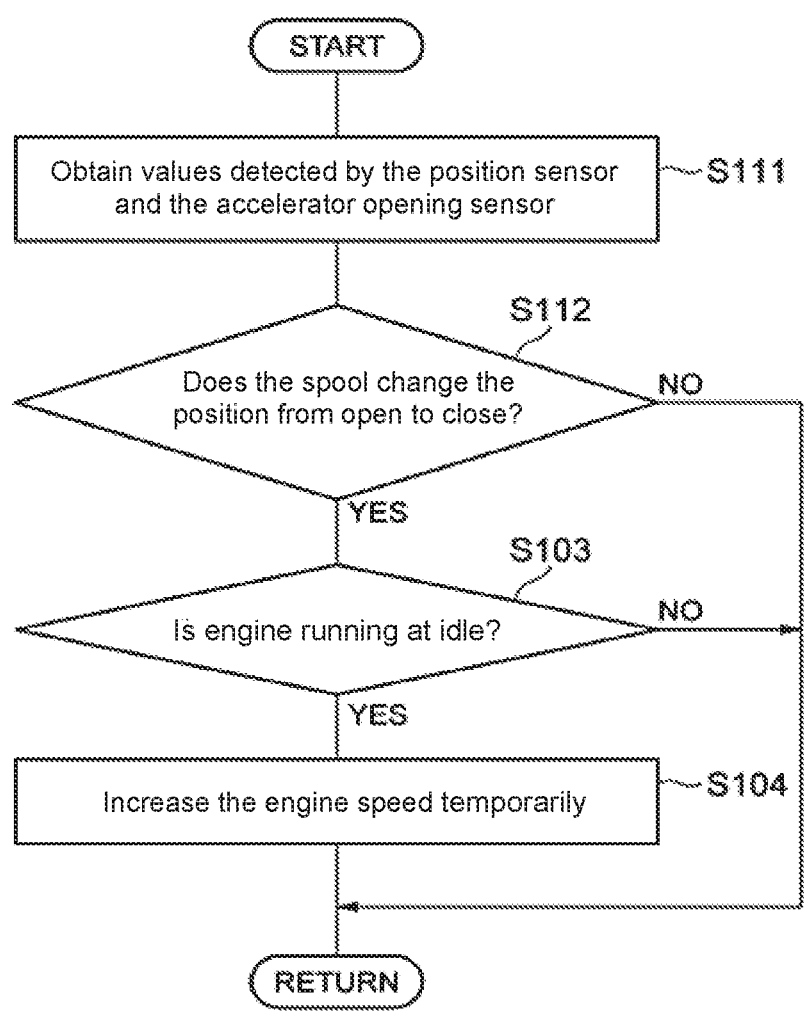

BRAKING SYSTEM OF INDUSTRIAL VEHICLE

CROSS-REFERENCE TO RELATED APPLICATION

This application claims priority to Japanese Patent Application No. 2018-107777 filed on Jun. 5, 2018, the entire disclosure of which is incorporated herein by reference.

BACKGROUND ART

The present disclosure relates to a braking system of an industrial vehicle.

An example of known technologies of braking systems for industrial vehicles is disclosed in Japanese Examined Utility Model Application Publication No. S63-33692. The braking system according to the above publication includes a hydraulic pump driven by an engine, a brake cylinder driven by hydraulic oil discharged from the hydraulic pump, a brake valve disposed between the hydraulic pump and the brake cylinder controlling the hydraulic oil supplied from the hydraulic pump to the brake cylinder when a brake pedal is pressed, and an accumulator for accumulating the hydraulic oil. At failures such as an engine stall, the hydraulic oil accumulated in the accumulator is supplied to the brake cylinder.

The braking system as described above includes a hydraulic oil cooler for cooling the hydraulic oil so as to cool the brake apparatus by supplying the hydraulic oil cooled by the hydraulic oil cooler to the brake apparatus. In this case, the braking system is required to have a charge valve for switching between an oil channel to supply the hydraulic oil from the hydraulic pump to the accumulator and an oil channel to supply the hydraulic oil from the hydraulic pump to the hydraulic oil cooler. However, if a setting value of the hydraulic oil pressure accumulated in the accumulator is too high, the high hydraulic oil pressure is applied to the hydraulic pump at a moment when the charge valve switches from an oil channel for the hydraulic oil cooler to that for the accumulator. This could result in application of a sudden extreme load to the engine, causing the engine to be stalled if the load is high enough to be intolerable to the engine.

The present disclosure has been made in view of the above circumstances and is directed to providing a braking system of an industrial vehicle to prevent an engine stall when the oil channel is switched.

SUMMARY

In accordance with an aspect of the present disclosure, there is provided a braking system of an industrial vehicle. The braking system having an engine includes a braking operation section, a brake apparatus driven by hydraulic oil, a hydraulic pump driven by the engine and discharging hydraulic oil, an accumulator accumulating the hydraulic oil discharged from the hydraulic pump, a brake valve controlling the hydraulic oil supplied from the accumulator to the brake apparatus according to the operation of the braking operation section, a hydraulic oil cooler cooling the hydraulic oil discharged from the hydraulic pump, a cooling channel cooling the brake apparatus by supplying the hydraulic oil cooled by the hydraulic oil cooler to the brake apparatus, a switch valve switching between a first oil channel that allows supplying the hydraulic oil from the hydraulic pump to the accumulator but does not allow supplying the hydraulic oil from the hydraulic pump to the hydraulic oil cooler, and a second oil channel that allows supplying the hydraulic oil from the hydraulic pump to the hydraulic oil cooler, a first detecting section detecting timing to switch the switch valve from the second oil channel to the first oil channel, a second detecting section detecting whether or not the engine is running at idle, and a controlling section controlling the engine to increase an engine speed of the engine when the first detecting section detects the timing to switch the switch valve from the second oil channel to the first oil channel and the second detecting section detects that the engine is running at idle.

Other aspects and advantages of the disclosure will become apparent from the following description, taken in conjunction with the accompanying drawings, illustrating by way of example the principles of the disclosure.

BRIEF DESCRIPTION OF THE DRAWINGS

The disclosure, together with objects and advantages thereof, may best be understood by reference to the following description of the presently preferred embodiments together with the accompanying drawings in which:

FIG. 7 is a flow diagram showing an engine controlling procedure to be processed by a controller shown in FIG. 5.

DETAILED DESCRIPTION OF THE EMBODIMENTS

Figure 1:
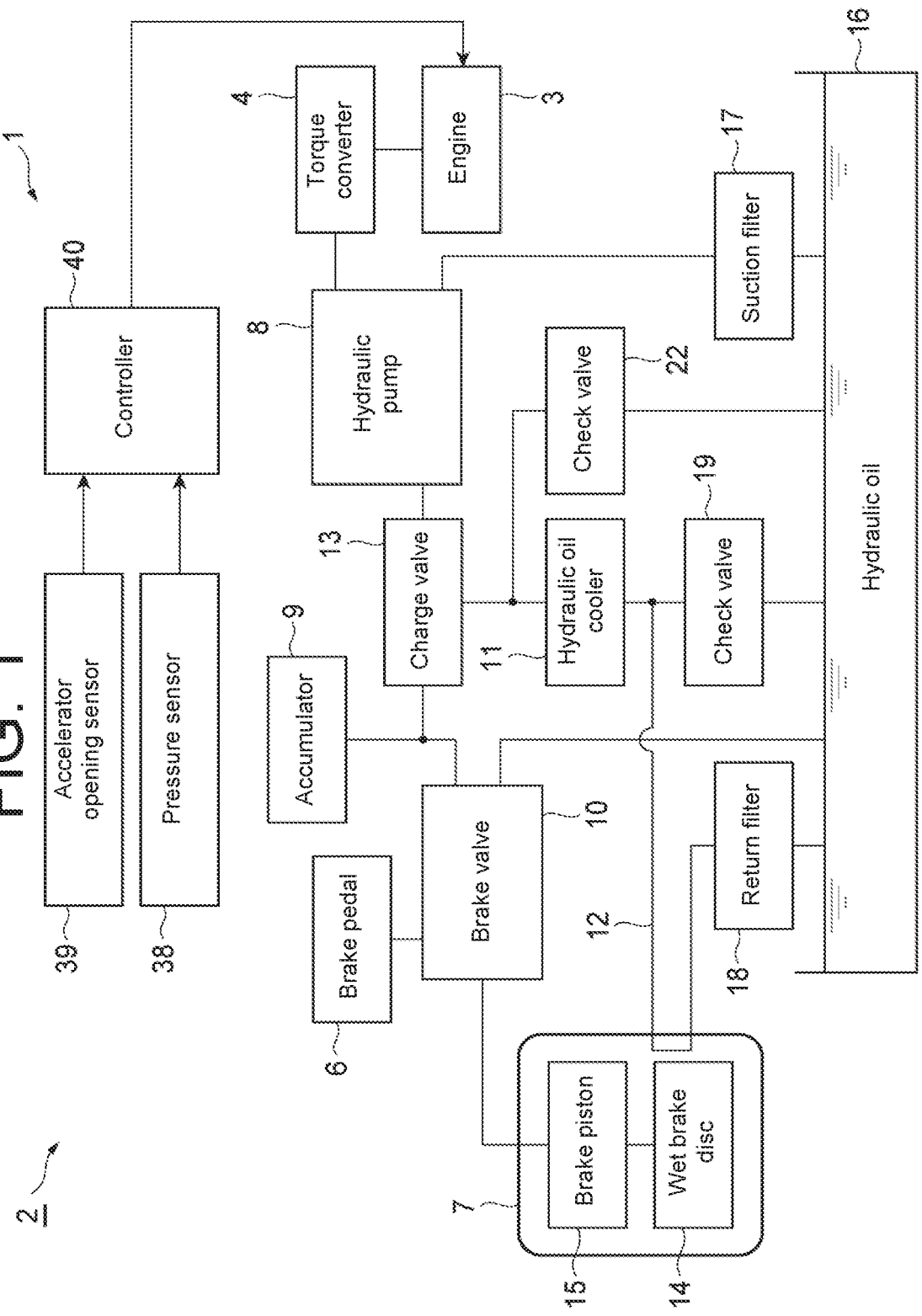
FIG. 1 is a schematic block diagram showing a braking system of an industrial vehicle according to a first embodiment of the present disclosure.

Embodiments of the present disclosure will be described in the following paragraphs with reference to the accompanying drawings. In the drawings, the identical reference numerals are assigned to components identical or equivalent to those in the drawings described before. Duplicated descriptions of the identical or equivalent configurations will be omitted or simplified.

FIG. 1 is a schematic block diagram showing a braking system of an industrial vehicle according to a first embodiment of the present disclosure. The braking system 1 according to the first embodiment shown in FIG. 1 is mounted on a forklift truck 2 as an industrial vehicle. The forklift truck 2 includes an engine 3 and a torque converter 4 coupled to an output shaft from the engine 3.

The braking system 1 includes a brake pedal 6, a wet brake apparatus 7, a hydraulic pump 8, an accumulator 9, a brake valve 10, a hydraulic oil cooler 11, a cooling channel 12, and a charge valve 13.

The brake pedal 6 is a braking operation section to be used by an operator. The wet brake apparatus 7 includes a wet brake disc 14 for braking an axle shaft (not shown) of the forklift truck 2, and a brake piston 15 for operating the wet brake disc 14. The brake piston 15 is driven by hydraulic oil.

The hydraulic pump 8 is driven by the engine 3 through the torque converter 4. The hydraulic pump 8 sucks the hydraulic oil reserved in an oil tank 16 and discharges the oil. A suction filter 17 is disposed in a flow channel between the oil tank 16 and the hydraulic pump 8 to prevent foreign objects from entering the hydraulic pump 8.

The accumulator 9 accumulates the hydraulic oil discharged from the hydraulic pump 8. The brake valve 10 is disposed between the accumulator 9 and the brake piston 15. The brake valve 10 controls the hydraulic oil supplied from the accumulator 9 to the brake piston 15 according to the operation of the brake pedal 6. More specifically, the brake valve 10 controls the quantity of the hydraulic oil supplied from the accumulator 9 to the brake piston 15 according to the manipulated amount of the brake pedal 6.

The hydraulic oil cooler 11 cools the hydraulic oil discharged from the hydraulic pump 8. The cooling channel 12 cools the wet brake disc 14 by supplying the hydraulic oil cooled by the hydraulic oil cooler 11 to the wet brake apparatus 7. The cooling channel 12 connects the hydraulic oil cooler 11 to the oil tank 16. The hydraulic oil returns to the oil tank 16 after having cooled the wet brake disc 14. A return filter 18 is disposed in the cooling channel 12 between the wet brake apparatus 7 and the oil tank 16. A check valve 19 is disposed in a flow channel between the hydraulic oil cooler 11 and the oil tank 16.

The charge valve 13 is disposed between the hydraulic pump 8 and the accumulator 9 as well as between the hydraulic pump 8 and the hydraulic oil cooler 11. The charge valve 13 is a switch valve to switch between a first oil channel 20 (in FIG. 3B) that allows supplying the hydraulic oil from the hydraulic pump 8 to the accumulator 9 but does not allow supplying the hydraulic oil from the hydraulic pump 8 to the hydraulic oil cooler 11, and a second oil channel 21 (in FIG. 3A) that allows supplying the hydraulic oil from the hydraulic pump 8 to the accumulator 9 as well as to the hydraulic oil cooler 11. A check valve 22 is disposed in a flow channel between the charge valve 13 and the oil tank 16.

Figure 2:
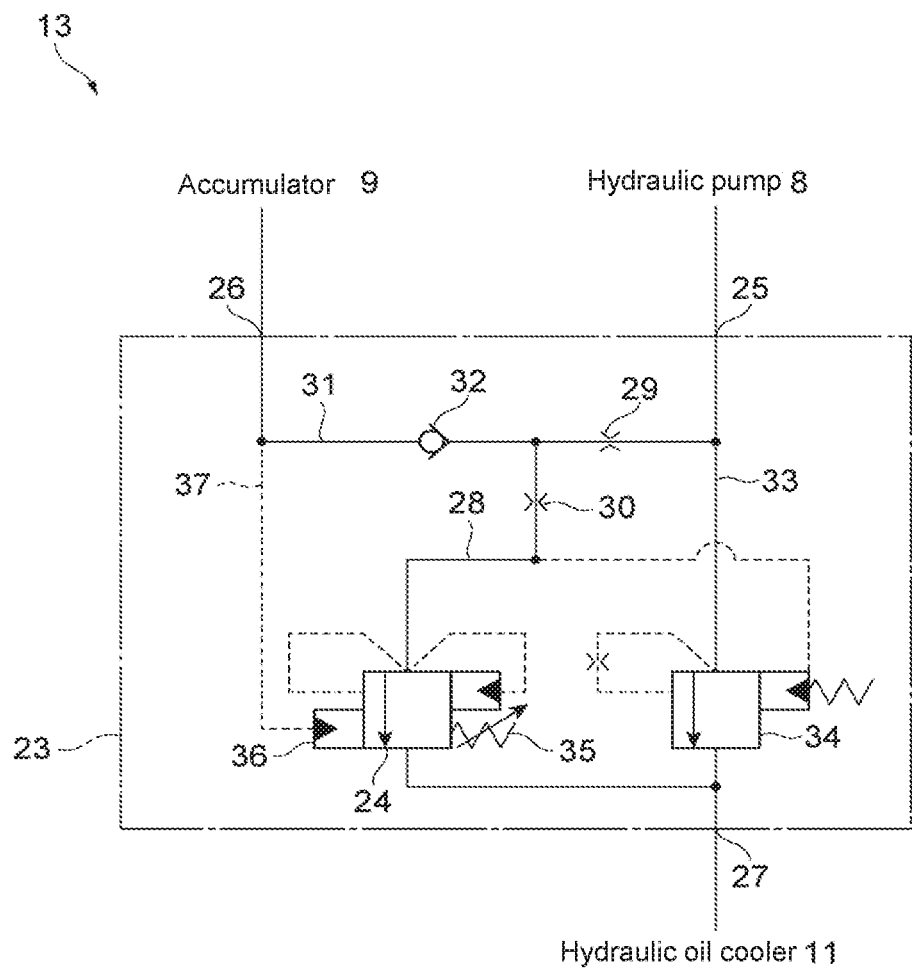
FIG. 2 is a schematic circuit diagram of hydraulic oil pressure of a charge valve shown in FIG. 1.

FIG. 2 is a schematic circuit diagram of hydraulic oil pressure of the charge valve 13. The charge valve 13 shown in FIG. 2 includes a housing 23 and a spool 24 disposed in the housing 23. The housing 23 accommodates a port 25 connected to the hydraulic pump 8, a port 26 connected to the accumulator 9, and a port 27 connected to the hydraulic oil cooler 11.

The port 25 and the port 27 are connected through a flow channel 28. The spool 24 is disposed in the flow channel 28. In the flow channel 28 between the port 25 and the spool 24, throttle valves 29 and 30 are disposed from upstream towards downstream in this order. The throttle valves 29 and 30 in the flow channel 28 are connected to the port 26 through a flow channel 31. In the flow channel 31, a check valve 32 is disposed only to allow the flow direction of the hydraulic oil from the port 25 to the port 26. The port 25 and the port 27 are connected through a flow channel 33. In the flow channel 33, a relief valve 34 is disposed which opens when the oil pressure at the port 25 becomes excessive.

The spool 24 is configured to shift between an opened position and a closed position according to oil pressure at the port 26 (an oil pressure in the accumulator 9). A spring 35 is disposed at one side of the spool 24. A pilot operation section 36 is disposed at the other side of the spool 24. The pilot operation section 36 and the flow channel 31 are connected through a pilot channel 37. A pilot pressure equivalent to the oil pressure in the accumulator 9 is applied to the pilot channel 37.

When the pilot pressure is less powerful than an urging force of the spring 35, the spool 24 is at the closed position (shown in FIG. 2) to block the flow of hydraulic oil from the port 25 to the port 27. Therefore, the hydraulic oil from the hydraulic pump 8 is supplied only to the accumulator 9 but not to the hydraulic oil cooler 11. When the pilot pressure is more powerful than the urging force of the spring 35, the spool 24 is shifted from the closed position to the opened position to allow flow of the hydraulic oil from the port 25 to the port 27. Therefore, the hydraulic oil from the hydraulic pump 8 is supplied both to the accumulator 9 and to the hydraulic oil cooler 11. In this case, the hydraulic oil from the hydraulic pump 8 is supplied to the accumulator 9 before the hydraulic oil cooler 11 to which an excessive amount is supplied (shown in FIG. 3A).

Figure 3A:
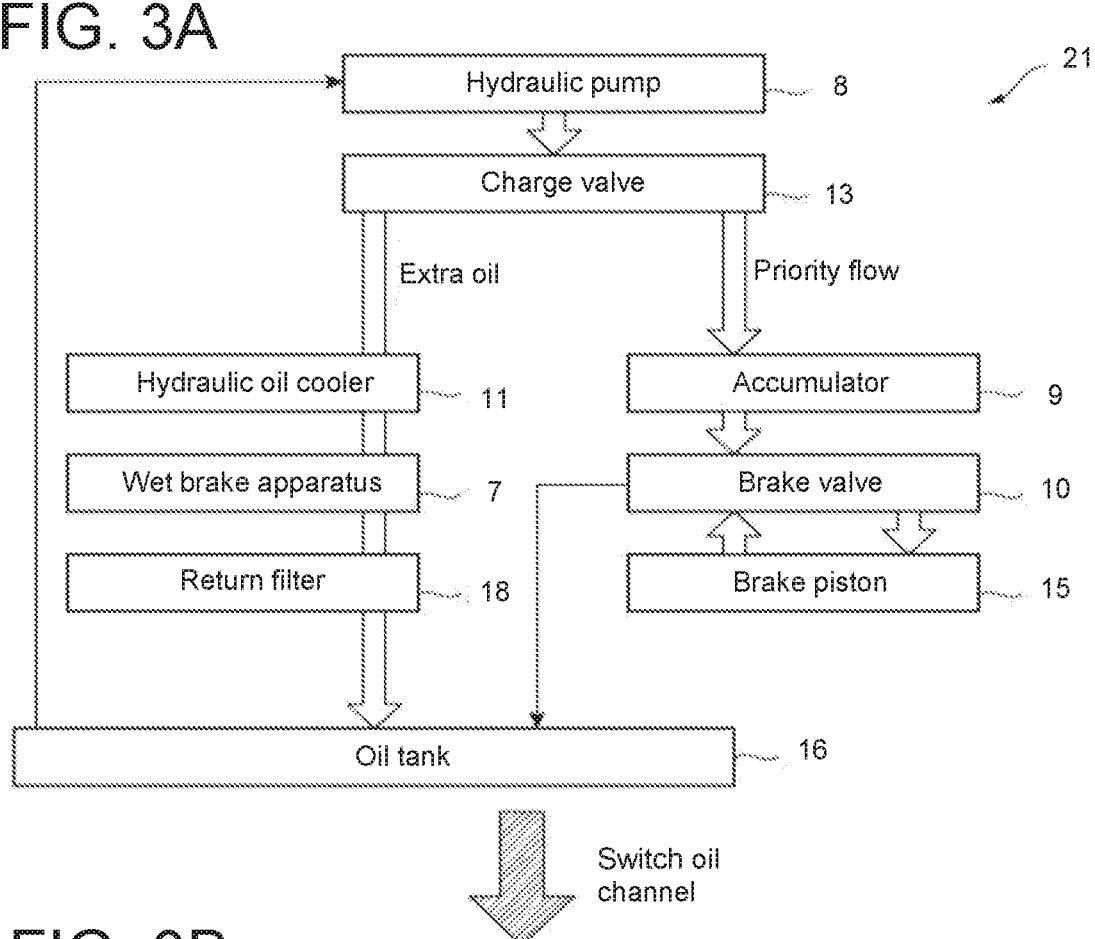
FIGS. 3A and 3B configure a combined flow diagram of hydraulic oil pressure when the charge valve shown in FIG. 1 switches oil channels.
Figure 3B:
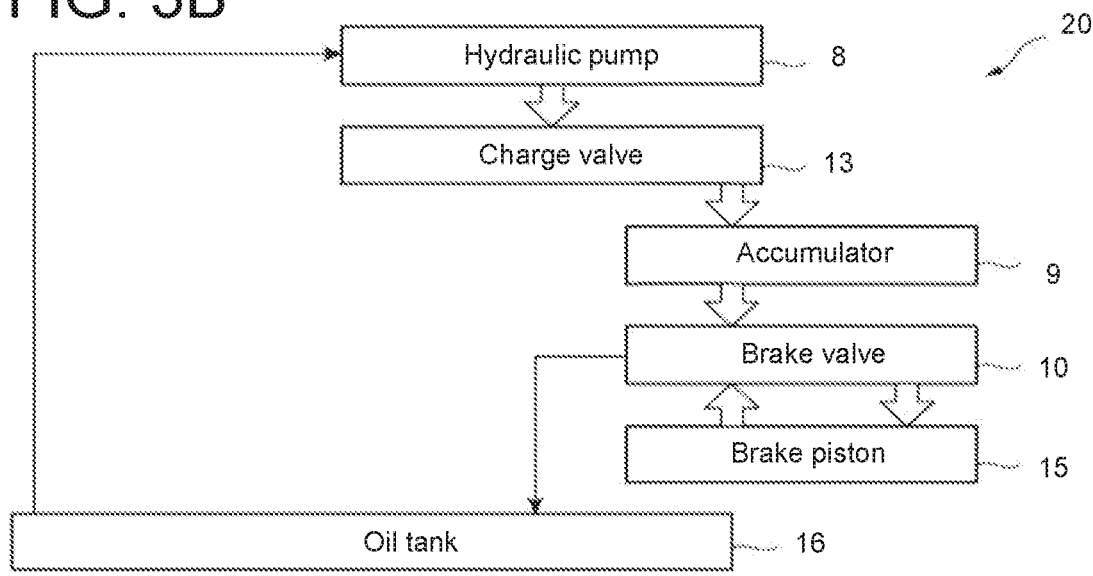

In this way, the charge valve 13 is switched from the second oil channel 21 to the first oil channel 20 as shown in FIGS. 3A and 3B when the oil pressure in the accumulator 9 is at a setting value or less. Then, the hydraulic oil from the hydraulic pump 8 is supplied to the accumulator 9 through the charge valve 13 to be accumulated therein.

On the other hand, the charge valve 13 is switched from the first oil channel 20 to the second oil channel 21 when the oil pressure in the accumulator 9 exceeds the setting value. Then, the hydraulic oil from the hydraulic pump 8 is supplied to the accumulator 9 before the hydraulic oil cooler 11. After accumulation of the hydraulic oil into the accumulator 9 has been completed, the hydraulic oil from the hydraulic pump 8 is supplied to the hydraulic oil cooler 11 through the charge valve 13.

When the brake pedal 6 is pressed, the brake valve 10 is opened, the hydraulic oil accumulated in the accumulator 9 is supplied to the brake piston 15, and then the wet brake disc 14 is activated. The hydraulic oil cooled by the hydraulic oil cooler 11 flows through the cooling channel 12 to be supplied to the wet brake apparatus 7 to cool the wet brake disc 14.

When the wet brake apparatus 7 is used, the hydraulic oil accumulated in the accumulator 9 is consumed, and thus the oil pressure in the accumulator 9 decreases. When the oil pressure in the accumulator 9 drops to the setting value or less, the charge valve 13 is switched from the second oil channel 21 to the first oil channel 20, and the hydraulic oil is accumulated in the accumulator 9 again.

With reference back to FIG. 1, the braking system 1 further includes a pressure sensor 38, an accelerator opening sensor 39, and a controller 40.

The pressure sensor 38 detects the oil pressure of the accumulator 9. The pressure sensor 38 serves as a first detecting section to detect a timing to switch the charge valve 13 from the second oil channel 21 to the first oil channel 20. The accelerator opening sensor 39 detects a pressed amount (an accelerator opening rate) of an accelerator pedal (not shown). The accelerator opening sensor 39 serves as a second detecting section for detecting whether or not the engine 3 is running at idle.

The controller 40 includes components such as a CPU, a RAM, a ROM, and input and output interfaces. The controller 40 serves as a controlling section to control the engine 3 based on values detected by the pressure sensor 38 and the accelerator opening sensor 39.

Figure 4:
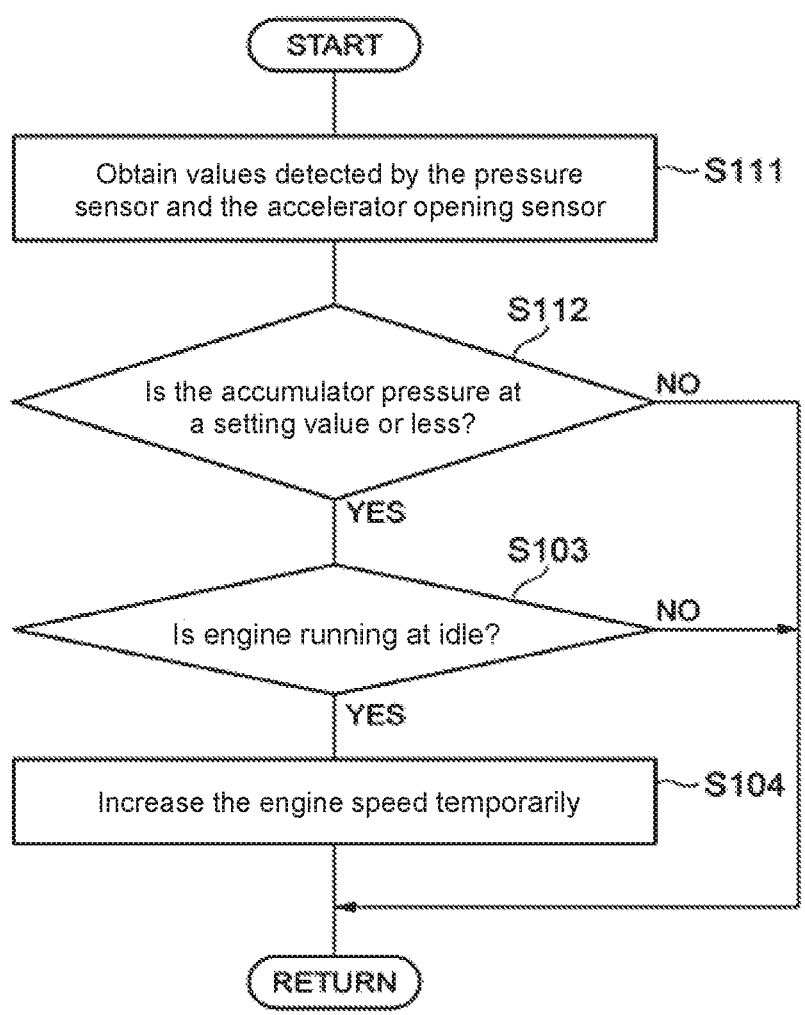
FIG. 4 is a flow diagram showing an engine controlling procedure to be processed by a controller shown in FIG. 1.

FIG. 4 is a flow diagram showing an engine controlling procedure to be processed by the controller 40 shown in FIG. 1. The controller 40 shown in FIG. 4 obtains values detected by the pressure sensor 38 and the accelerator opening sensor 39 (Step S101).

Then, the controller 40 determines whether or not the oil pressure in the accumulator 9 is at the setting value or less based on the value detected by the pressure sensor 38 (Step S102). The setting value corresponds to a pressure of the urging force of the spring 35 at the spool 24 in the charge valve 13. When the oil pressure in the accumulator 9 is at the setting value or less, the spool 24 is at the closed position. Therefore, the controller 40 determines whether or not the timing to switch the charge valve 13 from the second oil channel 21 to the first oil channel 20 is detected by determining whether or not the oil pressure in the accumulator 9 is at the setting value or less.

When the controller 40 determines that the oil pressure in the accumulator 9 is at the setting value or less, the controller 40 then determines whether or not the engine 3 is running at idle based on a value detected by the accelerator opening sensor 39 (Step S103).

When the controller 40 determines that the engine 3 is running at idle, the controller 40 controls the engine 3 to temporarily increase the engine speed (Step S104). The amount of time to increase the engine speed of the engine 3 is, for example, only for a few seconds.

When the controller 40 determines that the oil pressure in the accumulator 9 is not at the setting value or less in Step S102, or that the engine 3 is not running at idle in Step S103, the controller 40 does not execute Step S104.

According to the first embodiment of the present disclosure as described above, the charge valve 13 switches between the first oil channel 20 that allows supplying the hydraulic oil from the hydraulic pump 8 to the accumulator 9 but does not allow supplying the hydraulic oil from the hydraulic pump 8 to the hydraulic oil cooler 11, and a second oil channel 21 that allows supplying the hydraulic oil from the hydraulic pump 8 to the hydraulic oil cooler 11. The controller 40 controls the engine 3 to increase the engine speed of the engine when the first detecting section detects the timing to switch the charge valve 13 from the second oil channel 21 to the first oil channel 20 and when the second detecting section detects that the engine 3 is running at idle. In this way, even if a high pressure is applied to the hydraulic pump 8 causing to apply a sudden extreme load to the engine 3 when the charge valve 13 switches from the second oil channel 21 to the first oil channel 20, the engine speed of the engine 3 is increased, which prevents the engine 3 from stalling.

According to the first embodiment of the present disclosure, the timing to switch the charge valve 13 from the second oil channel 21 to the first oil channel 20 is detected at a reasonable cost because of use of the pressure sensor 38 for detecting the oil pressure in the accumulator 9.

According to the first embodiment of the present disclosure, the engine speed of the engine 3 is increased only temporarily, and thus, the adverse effect on the fuel consumption is limited.

Figure 5:
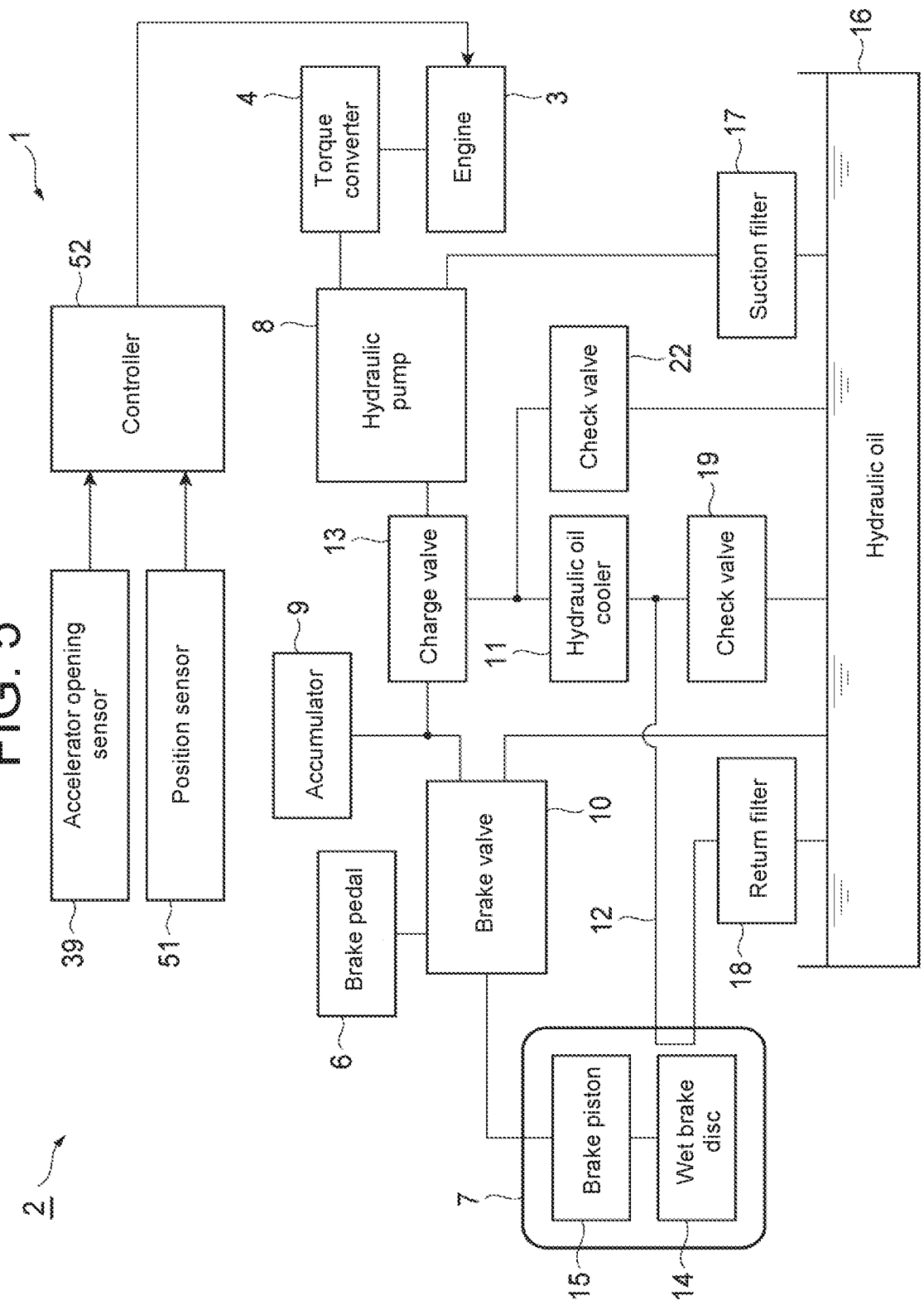
FIG. 5 is a schematic block diagram showing a braking system of an industrial vehicle according to a second embodiment of the present disclosure.

FIG. 5 is a schematic block diagram showing a braking system of an industrial vehicle according to a second embodiment of the present disclosure. The braking system 1 according to the second embodiment shown in FIG. 5 uses a position sensor 51 and a controller 52 instead of the pressure sensor 38 and the controller 40 according to the first embodiment.

Figure 6:
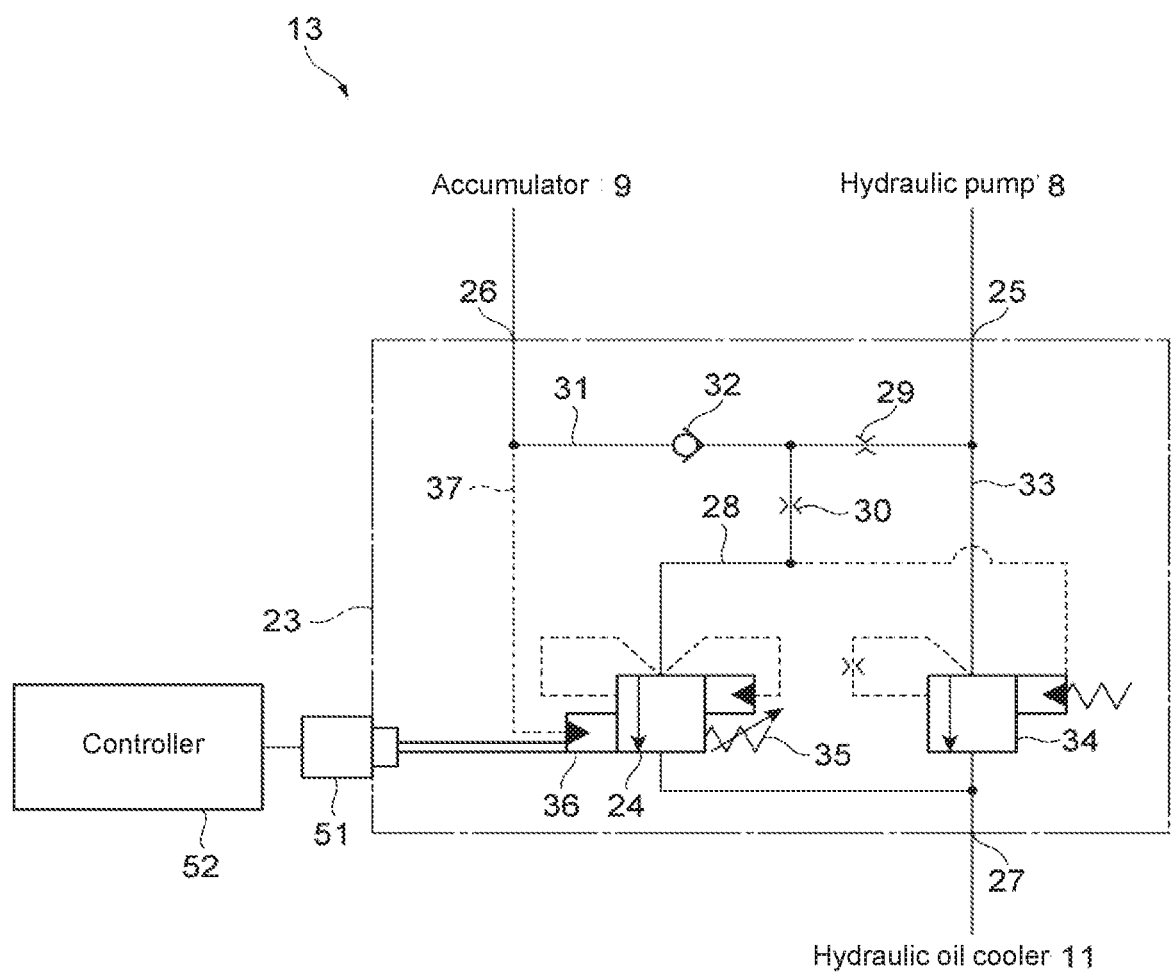
FIG. 6 is a schematic diagram of a position sensor shown in FIG. 5 along with a schematic circuit diagram of hydraulic oil pressure of a charge valve.

The position sensor 51 shown in FIG. 6 is a sensor for detecting the position of the spool 24 in the charge valve 13. The position sensor 51 is fixed to the housing 23 and coupled to the pilot operation section 36. The position sensor 51 serves as a first detecting section to detect a timing to switch the charge valve 13 from the second oil channel 21 to the first oil channel 20.

The second embodiment of the present disclosure uses the position sensor 51 as the first detecting section, for directly detecting the position of the spool 24. However, a stroke sensor may be used instead, to detect a stroke of the spool 24 so as to detect the position of the spool 24.

The controller 52 controls an engine 3 based on values detected by the position sensor 51 and the accelerator opening sensor 39.

FIG. 7 is a flow diagram showing an engine controlling procedure to be processed by the controller 52. The controller 52 shown in FIG. 7 obtains values detected by the position sensor 51 and the accelerator opening sensor 39 (Step S111).

The controller 52 then determines whether or not the spool 24 is shifted from the opened position to the closed position based on the value detected by the position sensor 51 (Step S112). Therefore, the controller 52 determines whether or not the timing to switch the charge valve 13 from the second oil channel 21 to the first oil channel 20 is detected by determining whether or not the spool 24 is shifted from the opened position to the closed position.

The controller 52 determines whether or not the engine 3 is running at idle based on a value detected by the accelerator opening sensor 39 when the controller 52 determines that the spool 24 is shifted from the opened position to the closed position (Step S103). When the controller 52 determines that the engine 3 is running at idle, the controller 52 controls the engine 3 to temporarily increase the engine speed (Step S104).

The controller 52 does not execute Step S104 when the controller 52 determines that the spool 24 is not shifted from the opened position to the closed position in Step S112 or that the engine 3 is not running at idle in Step S103.

The controller 52 also controls the engine 3 to increase the engine speed when the first detecting section detects the timing to switch the charge valve 13 from the second oil channel 21 to the first oil channel 20 and when the second detecting section detects that the engine 3 is running at idle according to the second embodiment of the present disclosure as described above. In this way, when the charge valve 13 switches from the second oil channel 21 to the first oil channel 20, the engine speed of the engine 3 is increased to prevent the engine 3 from stalling.

According to the second embodiment of the present disclosure, the sensor for detecting the position of the spool 24 in the charge valve 13 is used so that the timing to switch the charge valve 13 from the second oil channel 21 to the first oil channel 20 is directly detected.

The scope of the present disclosure is not limited to the embodiments described above. The embodiments described herein are configured to have the charge valve 13 that is normally allowed to supply the hydraulic oil from the hydraulic pump 8 to the accumulator 9. However, the scope of the present disclosure is not limited to this configuration. For example, the charge valve 13 may switch between a first oil channel that allows supplying the hydraulic oil from the hydraulic pump 8 to the accumulator 9 but does not allow supplying the hydraulic from the hydraulic pump 8 to the hydraulic oil cooler 11, and a second oil channel that allows supplying the hydraulic oil from the hydraulic pump 8 to the hydraulic oil cooler 11 but does not allow supplying the hydraulic from the hydraulic pump 8 to the accumulator 9.

The embodiments described herein are configured to control the engine 3 to temporarily increase the engine speed upon detection of the timing to switch the charge valve 13 from the second oil channel 21 to the first oil channel 20 as well as detection of the engine 3 running at idle. However, the scope of the present disclosure is not limited to the above configuration. The engine speed of the engine 3 may be increased continuously (e.g. for tens of seconds or several minutes).

The braking system 1 according to the embodiments described herein is mounted on the forklift truck 2. However, the present disclosure may apply to an industrial vehicle other than forklift trucks as far as an engine is provided as a driving source.

What is claimed is:

1. A braking system of an industrial vehicle having an engine, the braking system comprising:
    a braking operation section;
    a brake apparatus driven by hydraulic oil;
    a hydraulic pump driven by the engine and discharging hydraulic oil;
    an accumulator accumulating the hydraulic oil discharged from the hydraulic pump;
    a brake valve controlling the hydraulic oil supplied from the accumulator to the brake apparatus according to operation of the braking operation section;
    a hydraulic oil cooler cooling the hydraulic oil discharged from the hydraulic pump;
    a cooling channel cooling the brake apparatus by supplying the hydraulic oil cooled by the hydraulic oil cooler to the brake apparatus;
    a switch valve switching between a first oil channel that allows supplying the hydraulic oil from the hydraulic pump to the accumulator but does not allow supplying the hydraulic oil from the hydraulic pump to the hydraulic oil cooler; and a second oil channel that allows supplying the hydraulic oil from the hydraulic pump to the hydraulic oil cooler;
    a first detecting section detecting timing to switch the switch valve from the second oil channel to the first oil channel;
    a second detecting section detecting whether or not he engine is running at idle; and
    a controlling section controlling the engine to increase an engine speed of the engine when the first detecting section detects the timing to switch the switch valve from the second oil channel to the first oil channel and the second detecting section detects that the engine is running at idle.

2. The braking system according to claim 1, wherein
    the first detecting section is a sensor detecting an oil pressure in the accumulator, and
    the controlling section determines whether or not the timing to switch the switch valve from the second oil channel to the first oil channel is detected by determining whether or not the oil pressure in the accumulator is at a setting pressure or less.

3. The braking system according to claim 1, wherein
    the switch valve includes a spool to shift between an opened position and a closed position according to the oil pressure in the accumulator,
    the first detecting section is a sensor detecting a spool position, and
    the controlling section determines whether or not the timing to switch the switch valve from the second oil channel to the first oil channel is detected by determining whether or not the spool is shifted from the opened position to the closed position.

4. The braking system according to claim 1, wherein
    the controlling section controls the engine to temporarily increase the engine speed when the first detecting section detects the timing to switch the switch valve from the second oil channel to the first oil channel and the second detecting section detects that the engine is running at idle.

* * * * *